United States Patent
Jones et al.

(10) Patent No.: US 6,568,993 B1
(45) Date of Patent: May 27, 2003

(54) FIXTURE FOR CLAMPING A GAS TURBINE COMPONENT AND ITS USE IN SHAPING THE GAS TURBINE COMPONENT

(75) Inventors: Daniel Edward Jones, Batavia, OH (US); Jacques Juneau, Jr., Amelia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/015,259

(22) Filed: Dec. 13, 2001

(51) Int. Cl.⁷ .................................................. B24B 7/30
(52) U.S. Cl. .................... 451/28; 451/365; 451/408; 269/238
(58) Field of Search ............................... 451/28, 49, 54, 451/55, 64, 364, 365, 406, 408, 460; 269/238, 32; 24/455, 489, 495, 499

(56) References Cited

U.S. PATENT DOCUMENTS

| | | | | |
|---|---|---|---|---|
| 2,577,747 A | * | 12/1951 | Gibian | 29/889.7 |
| 3,170,322 A | * | 2/1965 | Cavanaugh | 100/264 |
| 3,331,166 A | | 7/1967 | Brenning | |
| 3,818,646 A | | 6/1974 | Peterson | |
| 4,016,683 A | * | 4/1977 | Cretella | 451/226 |
| 4,038,861 A | * | 8/1977 | Hartkopf et al. | 414/745.9 |
| 4,051,636 A | * | 10/1977 | Heine | 409/110 |
| 4,128,929 A | * | 12/1978 | DeMusis | 29/402.18 |
| 4,519,279 A | * | 5/1985 | Ruggeri | 294/116 |
| 4,589,175 A | * | 5/1986 | Arrigoni | 29/402.18 |
| 4,638,602 A | | 1/1987 | Cavilieri | |
| 4,805,351 A | | 2/1989 | Dobson et al. | |
| 4,829,720 A | | 5/1989 | Cavalieri | |
| 5,222,421 A | * | 6/1993 | Ushiro | 279/126 |
| 5,556,326 A | * | 9/1996 | Rouyer et al. | 451/246 |
| 5,869,194 A | * | 2/1999 | Dwyer | 269/134 |
| 6,017,263 A | | 1/2000 | Dwyer | |
| 6,139,412 A | | 10/2000 | Dwyer | |
| 6,287,182 B1 | | 9/2001 | Dwyer | |

* cited by examiner

Primary Examiner—Eileen P. Morgan
Assistant Examiner—Hadi Shakeri
(74) Attorney, Agent, or Firm—V. G. Ramaswamy; Gregory O. Garmong

(57) ABSTRACT

A turbine component such as a turbine blade is clamped into a fixture having a base upon which a remainder of the fixture is supported and a stop which limits the movement of the turbine component. The fixture further has two clamp arms affixed to the base and which controllably clamp against one pair of the pressure surfaces of the root to force the turbine component against the stop, which preferably is contacted by another pair of the pressure surfaces of the root. When the turbine component is clamped in this position, its root may be readily shaped as by grinding.

18 Claims, 4 Drawing Sheets

US 6,568,993 B1

FIXTURE FOR CLAMPING A GAS TURBINE COMPONENT AND ITS USE IN SHAPING THE GAS TURBINE COMPONENT

This invention relates to fixturing to support a gas turbine component, and more specifically, to clamping the gas turbine component in the fixture and shaping the root of the gas turbine component.

BACKGROUND OF THE INVENTION

In the most commonly practiced approach, turbine blades for gas turbine engines are cast to approximately the final shape. Then portions of the turbine blade, such as the root and the shroud, if any, are shaped to the final desired form by a technique such as grinding. The turbine blade is thereafter processed by depositing protective coatings or by other procedures.

The finished turbine blades are assembled into a turbine disk or wheel, with a "dovetail" form on the root of each turbine blade engaging a respective conformably shaped slot on the turbine disk. The turbine disk is in turn supported on a shaft in the gas turbine engine. The turbine blades must have precisely established positions and angular orientations in the turbine disk. Any mispositioning and misorientation may lead to aerodynamic inefficiency and the introduction of unacceptable vibrations in the turbine disk and the turbine blade as the turbine disk turns during service.

Because it is the root of each turbine blade that engages the slot on the turbine disk, the root must be shaped very precisely. Two techniques have been widely used to hold the turbine blade in an exact location and orientation for the shaping of the root. In one, the airfoil of the turbine blade is cast into a matrix of a metal with a low melting point, which is used to hold the turbine blade with its root positioned for grinding or other shaping. This approach, while operable, requires that the low-melting-point metal be cleaned from the surface of the airfoil after the shaping of the root is completed. Even traces of the metal remaining after careful cleaning of the surface of the airfoil may adversely affect the subsequent application of the coatings. Mechanical fixtures or jigs have been developed to hold the turbine blade. These fixtures avoid the use of the low-melting-point metal, but have not been fully satisfactory because they misposition the root or because they do not hold the turbine blades sufficiently repeatably and securely so that each root is shaped the same.

There is a need for an improved approach to the shaping of the roots of turbine blades and other gas turbine components. The present invention fulfills this need, and further provides related advantages.

SUMMARY OF THE INVENTION

The present invention provides a fixture for holding a gas turbine component, such as a turbine blade, a compressor blade, or some types of vanes, in a specific fixed position for the shaping of the gas turbine component, and a method for performing the shaping. The approach does not use a molten metal whose complete removal is difficult. The fixture holds the gas turbine component using features of the gas turbine component that have been previously precisely established. This approach allows each gas turbine component to be processed precisely, quickly, reproducibly, without contamination, and with minimal dependence upon operator skill.

A fixture is provided for clamping a gas turbine component, such as a turbine blade, having a component longitudinal axis. The turbine component has a root having a root surface including a first pair of first pressure surfaces on either side of the component longitudinal axis and oriented at a first, preferably acute angle to the component longitudinal axis, a second pair of second pressure surfaces on either side of the component longitudinal axis and oriented at a second, preferably obtuse, angle to the component longitudinal axis, and a tang at an end of the root. The fixture comprises a base upon which the remainder of the fixture is supported, and a stop which prevents the gas turbine component moving past a stop limit when the gas turbine component is forced in a clamping direction parallel to the component longitudinal axis. The fixture further comprises two clamp arms, a first clamp arm on a leading-edge side of the gas turbine component with a first clamp surface facing the gas turbine component, and a second clamp arm on a trailing-edge side of the gas turbine component with a second clamp surface facing the gas turbine component. Each clamp arm is movable, preferably by a pivoting movement, between a released position in which its clamp surface does not contact one of the pressure surfaces and a clamped position in which its clamp surface contacts one of the pressure surfaces and forces the gas turbine component in the clamping direction and against the stop. A clamping force source, preferably an hydraulic cylinder, controllably moves each of the clamp arms between the released position and the clamped position.

Preferably, the first pair of first pressure surfaces engage the stop and the second pair of second pressure surfaces are contacted by the respective clamp surfaces. The stop is desirably in the form of a shoulder. Each clamp surface may be conformably shaped to the pressure surface that is contacted by the clamp surface when the clamp arm is in the clamped position.

A method for shaping a gas turbine component comprises the steps of furnishing the gas turbine component, as described above, and a fixture, as described above in its basic or modified forms. The gas turbine component is clamped in the fixture, and thereafter the root of the gas turbine component is shaped while the gas turbine component is clamped into the fixture. Preferably, the tang portion of the root is shaped by grinding. The end surfaces of the root may also be shaped, preferably by grinding.

The present-approach provides a convenient fixturing approach which avoids the use of molten metal and also ensures that the gas turbine component is properly and securely positioned for shaping of the root, particularly the tang of the root.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
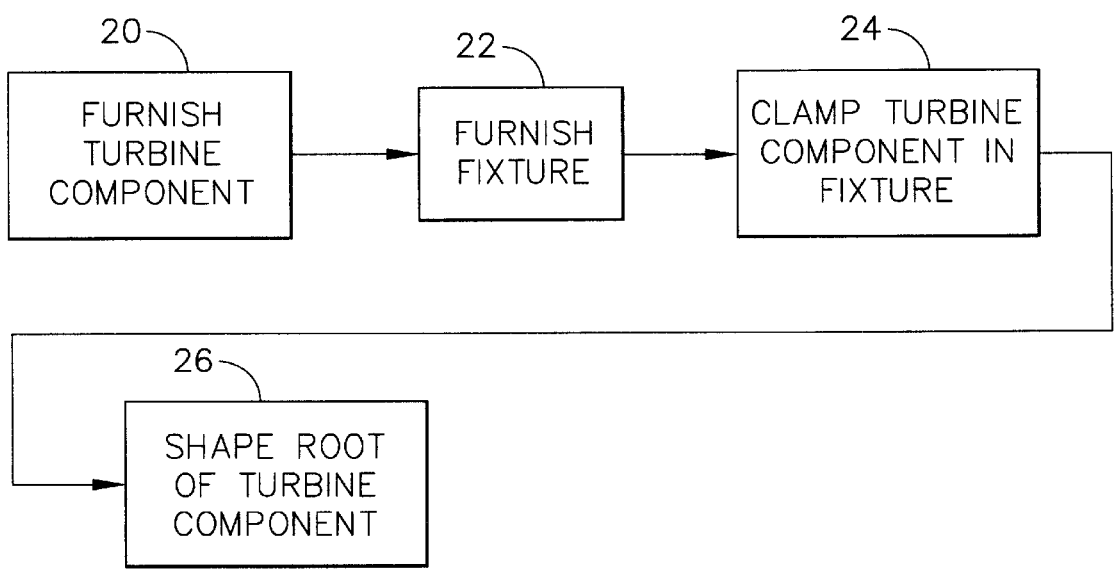
FIG. 1 is a block flow diagram of an approach for practicing the invention.
Figure 2:
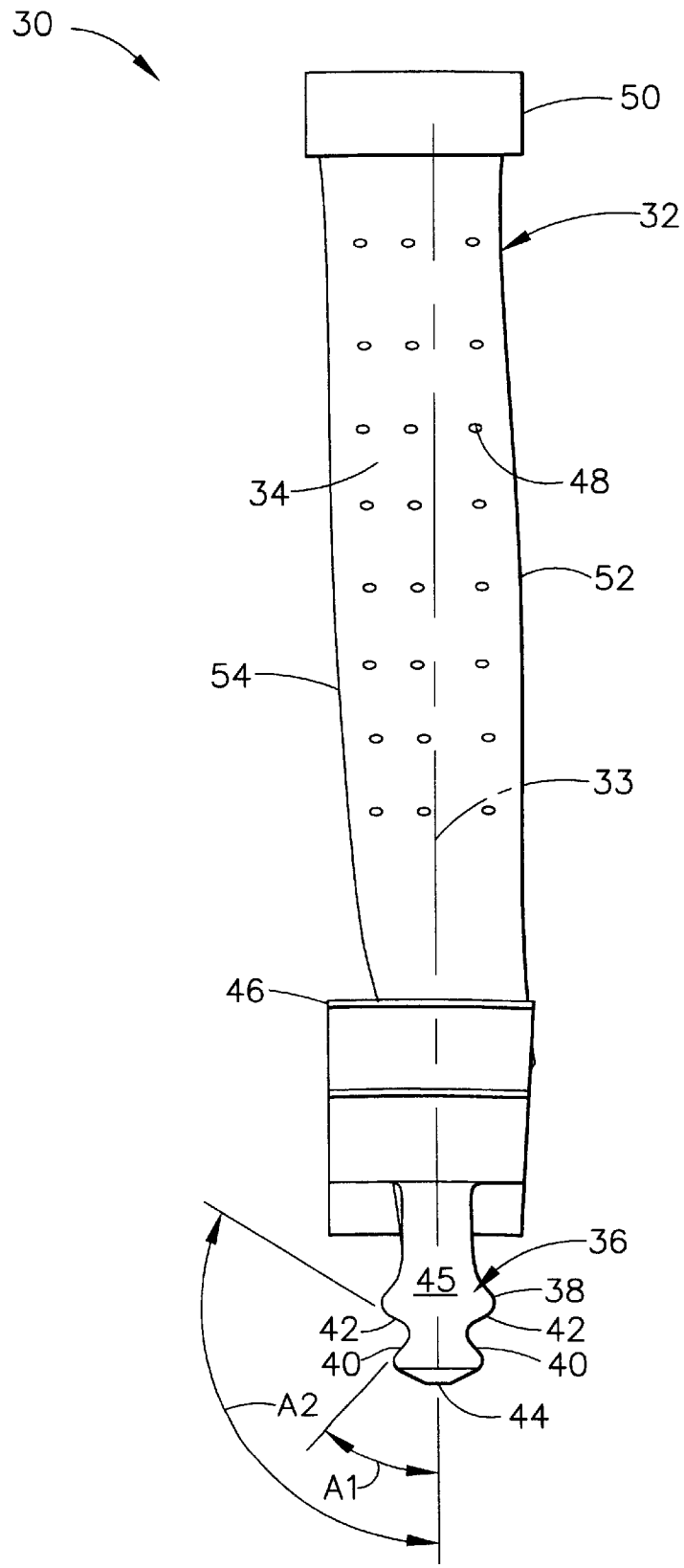
FIG. 2 is an elevational view of a turbine blade.

FIG. 1 depicts a method for shaping a gas turbine component. A gas turbine component is furnished, numeral 20. FIG. 2 depicts such a gas turbine component 30, in this case a turbine blade 32. The turbine blade 32 is formed of any operable material, but is preferably a superalloy such as a nickel-base superalloy or a cobalt-base superalloy. The turbine blade 32 has a component longitudinal axis 33 and includes an airfoil 34 against which the flow of hot exhaust gas is directed. The turbine blade 32 is mounted to a turbine disk (not shown) by a root 36 which extends downwardly from the airfoil 34 and engages a conforming slot on the turbine disk. The root 36 has a lateral root surface 38 which includes a first pair of first pressure surfaces 40 on either side of the component longitudinal axis and oriented at a first, preferably acute, angle A1 to the component longitudinal axis 33. The root 36 includes a second pair of second pressure surfaces 42 on either side of the component longitudinal axis 33 and oriented at a second, preferably obtuse, angle A2 to the component longitudinal axis 33. The root further includes a tang 44 at an end of the root 36 remote from the airfoil 34. The root 36 also has end surfaces 45 that are facing upwardly from and downwardly away from the plane of the page in FIG. 2. A platform 46 extends transversely outwardly from the area where the airfoil 34 is joined to the root 36. Optionally, a number of internal passages extend through the interior of the airfoil 34, ending in openings 48 in the surface of the airfoil 34. During service, a flow of cooling air is directed through the internal passages and out the openings 48 to reduce the temperature of the airfoil 34. A rotating shroud 50 is at the tip of the airfoil 34 remote from the root 36. The airfoil 34 may be described as having a leading edge 52 and a trailing edge 54.

Figure 3:
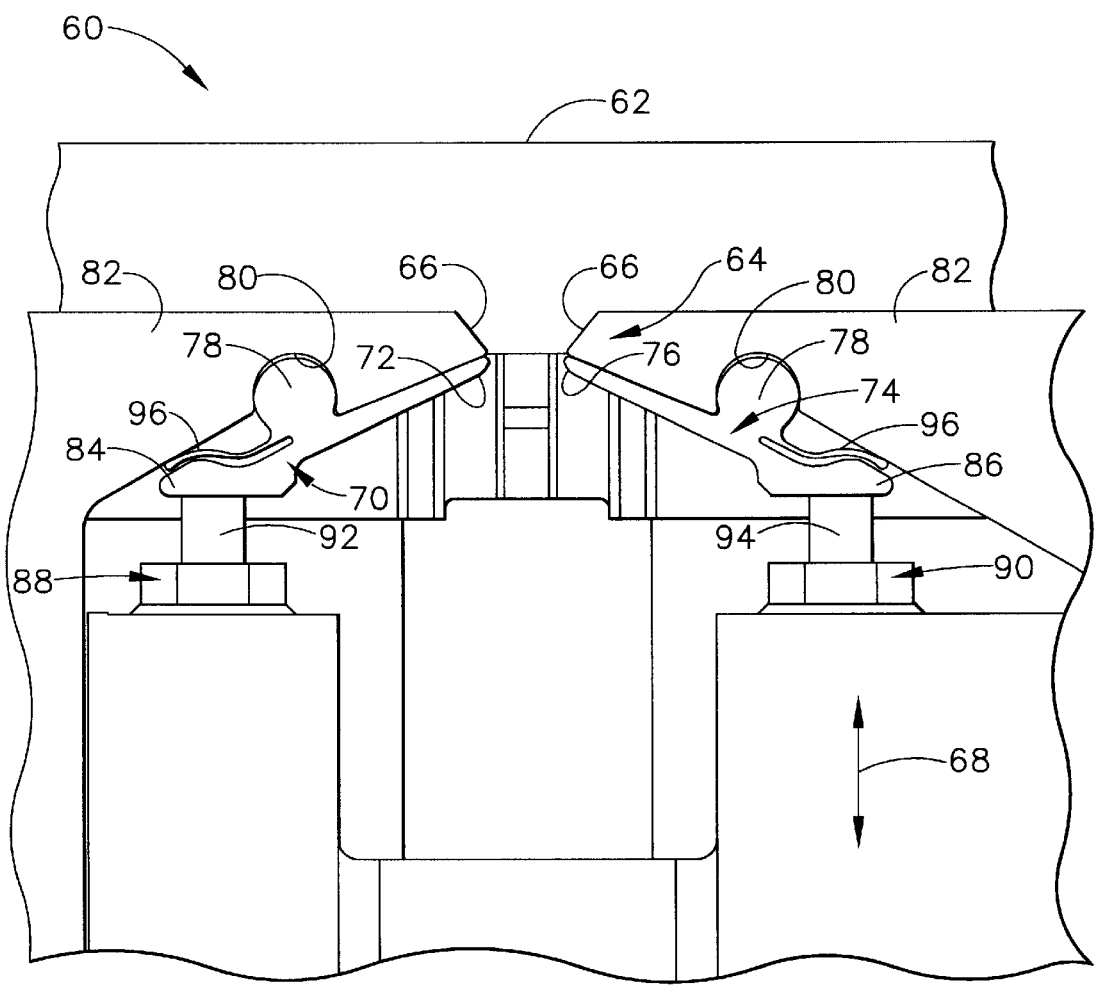
FIG. 3 is a plan view of a fixture in which the turbine blade is held for grinding, with the clamp arms in the unclamped position and without the turbine blade present.
Figure 4:
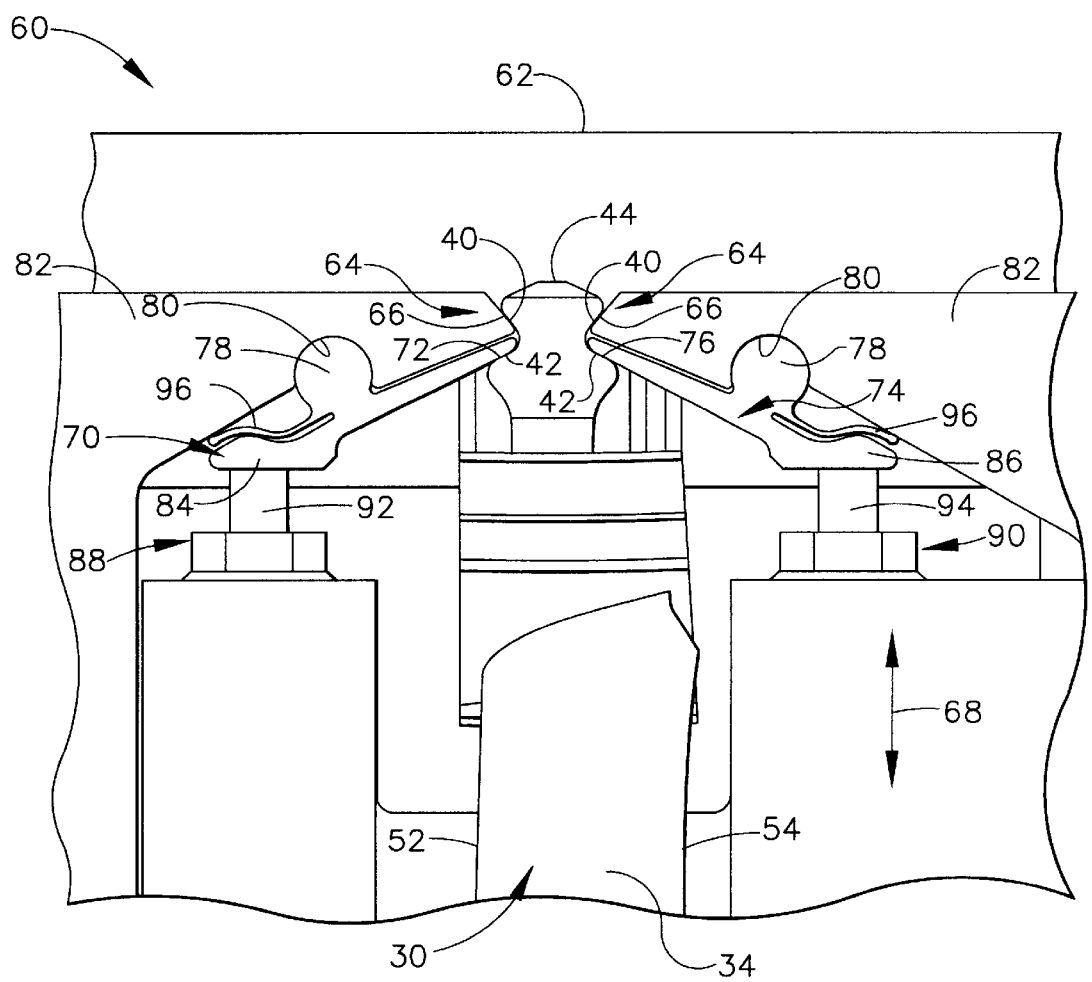
FIG. 4 is a plan view of a fixture in which the turbine blade is held for grinding, with the clamp arms in the clamped position and with the turbine blade present.

A fixture 60 to hold the gas turbine component 30 is provided, numeral 22 of FIG. 1. FIGS. 3 and 4 illustrate a preferred form of the fixture 60. In the view of FIG. 3, there is no gas turbine component 30 present, and in the view of FIG. 4, the gas turbine component 30 is present and clamped into place by the fixture 60. The fixture 60 includes a base 62 upon which the remainder of the fixture 60 is supported. A stop 64 is affixed to the base 62. The stop 64, preferably in the form of a pair of shoulders 66 on each side of the component longitudinal axis 52, engages the first pair of first pressure surfaces 40 to prevent the gas turbine component 30 from moving past a stop limit when the gas turbine component 30 is forced in a clamping direction 68 that is parallel to the component longitudinal direction 33. (In the illustrated preferred case, the clamping direction 68 extends from the root 36 toward the airfoil 34. The clamping direction 68 may be reversed to extend from the airfoil 34 toward the root 36 by reversing the positioning of the stop and the clamp arms.)

The fixture 60 includes two clamp arms, which are similar in structure except for the direction they face and possibly the shape of the clamp surfaces. The clamp arms are supported directly on the base 62 or, alternatively, indirectly on structure which in turn is supported on the base 62. A first clamp arm 70 is on a leading-edge 52 side of the gas turbine component 30. A first clamp surface 72 of the first clamp arm 70 faces the gas turbine component 30. A second clamp arm 74 is on a trailing-edge 54 side of the gas turbine component 30. A second clamp surface 76 of the second clamp arm 74 faces the gas turbine component 30.

Each clamp arm 70, 74 is movable between a released position (illustrated in FIG. 3), in which its respective clamp surface 72, 76 does not contact one of the second pair of second pressure surfaces 42, and a clamped position (illustrated in FIG. 4) in which its respective clamp surface 72, 76 contacts the one of the second pair of second pressure surfaces 42. Preferably, each clamp arm 70, 74 achieves its movement by a pivoting action. The pivoting action may be accomplished by providing a pivot pin between the respective clamp arms 70, 74 and the base 62. More preferably, and as illustrated, the pivoting action is achieved by providing a protrusion 78 at an intermediate point along the length of each of the clamp arms 70, 74. The protrusion 78 is received with a running bearing fit into a respective conforming recess 80 on each of respective stop supports 82 which support the stops 64. The clamp arm 70, 74 is thereby allowed to move by a pivoting action when a respective remote end 84, 86 of the clamp arms 70, 74 remote from the respective clamping surfaces 72, 76 is forced toward the respective stop support 82.

When the clamp arms 70, 74 are moved away from the locations where they contact the respective second pressure surfaces 42, as in FIG. 3, there is a clearance so that a gas turbine component 30 may be loaded into the fixture 60. When the clamp arms 70, 74 are thereafter moved to the clamped positions of FIG. 4, they together force the gas turbine component 30 in the clamping direction 68 so that the gas turbine component 30 is clamped against the stops 64. Specifically, in the illustrated preferred case of FIG. 4, the turbine blade 32 is forced downwardly by the clamping pressure against the respective second pressure surfaces 42, so that the first pair of first pressure surfaces 40 are forced against the respective shoulders 66 of the stop 64.

Each clamp arm 70, 74 is provided with a respective clamping force source 88, 90 that controllably moves the respective clamp arm 70, 74 between the released position and the clamped position of FIG. 3. Each clamping force source 88, 90 may be of any operable type. Conveniently, the clamping force sources 88 and 90 each comprise a respective hydraulic (operating with any operable liquid or gaseous medium, but preferably a liquid medium to achieve large clamping forces) cylinder 92, 94 that operate in tandem against the respective remote ends 84, 86 to move the respective clamp arms 70, 74. That is, the clamping force sources 88 and 90 both move the respective clamp arms 70 and 72 to the released position or to the clamped position, so that the gas turbine component 30 is symmetrically clamped on the leading edge 52 side and the trailing edge 54 side. A return leaf spring 96 on each of the clamp arms 70, 74 acts against the respective stop support 82 to return the clamp arms 70, 74 to their released positions when the clamping force sources 88 and 90 are operated such that they do not force the clamp arms 70, 74 to the clamped position.

The pressure surfaces 40 and 42 may be flat, or more typically they are curved with different curvatures. The two first pressure surfaces 40 may be of different curvatures, and the two second pressure surfaces 42 may be of different curvatures. Preferably, the stop 64 is conformably shaped to that portion of the first pressure surface 40 that it contacts when the clamp arms 70 and 74 are in the clamped position; and each clamp surface 72, 76 is conformably shaped to that portion of the second pressure surface 42 that is contacted by the respective clamp surfaces 72, 76 when the respective clamp arms 70, 74 are in the clamped position of FIG. 4. This conforming shaping of the stop 64 and the clamp surfaces 72, 76 to the contacted portions of the root surface 38 aids in assuring a non-slipping, secure, precisely positioned clamping of the gas turbine component 30 in the fixture 60.

Returning to FIG. 1, the gas turbine component 30 is inserted into the fixture 60 when the clamp arms 70, 74 are in the released positions, so that there is sufficient clearance and room to insert the gas turbine component 30. In normal use, the base 62 lies in a vertical plane, so that the clamping direction 68 is approximately vertical. The gas turbine component 30 is loaded into the fixture 60 so that one of its end surfaces 45 contacts the base 62. The gas turbine component 30 initially hangs from the shoulders 66, and then is securely clamped into position by the clamp arms 70 and 74. The gas turbine component 30 is clamped into the fixture 60, numeral 24, by moving the clamp arms 70, 74 to the clamped position of FIG. 4. With the described fixture, it was found that the gas turbine component 30 readily and automatically self centers within the fixture 60 as the clamping action occurs, avoiding any effect of a slight amount of operator misplacement when the gas turbine component 30 is inserted into the fixture 60.

The root 36, including the tang 44 and/or the end surfaces 45 of the root 36, is shaped, numeral 26. The shaping 26 is accomplished by any operable approach, but preferably grinding using a creep feed grinder and grinding technique is used. The creep feed grinder takes relatively large bites of material with each pass, typically on the order of 0.20 inches per pass, and the grinding tool moves rapidly with respect to the root 36, typically on the order of 45 inches per minute. The forces transmitted to the root 36 and thence to the gas turbine component 30, and the vibrations potentially introduced into the gas turbine component 30, by the creep feed grinder are relatively large. The root 36 must therefore be clamped very securely by the fixture 60, and the present fixture 60 provides that secure support of the gas turbine component 30.

The clamping of the gas turbine component 30 using the illustrated fixture 60 generates the clamping force between the two oppositely facing pairs of pressure surfaces 40 and 42, on each side of the component longitudinal axis 33. In the preferred practice of the present approach, the pressure surfaces 40 and 42 would have been previously shaped using another fixture, so that they are precisely shaped, positioned, and oriented relative to the remainder of the gas turbine component 30, as required. Using the precisely shaped pressure surfaces 40 and 42 as the datum for positionally and angularly aligning the tang 44 and/or the end surfaces 45 results in the tang 44 and/or the end surfaces 45 being precisely machined relative to the root surface 38. This two-step shaping of first the pressure surfaces 40, 42 and then the tang 44 and/or the end surfaces 45 results in the pressure surfaces, the tang, and the end surfaces being precisely positioned relative to each other, which is important for the holding of the gas turbine component 30 in its slot in the turbine disk, and relative to the airfoil 34 and the shroud 50, which is important for positioning the airfoil 34 precisely in the gas flow path of the gas turbine engine.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fixture used with a turbine component having a component longitudinal axis and comprising a root having a root surface including a first pair of first pressure surfaces on either side of the component longitudinal axis and oriented at a first angle to the component longitudinal axis, a second pair of second pressure surfaces on either side of the component longitudinal axis and oriented at a second angle to the component longitudinal axis, and a tang at an end of the root, the fixture comprising a base;
a stop affixed to the base and which prevents the turbine component from moving past a stop limit when the turbine component is forced in a clamping direction parallel to the component longitudinal axis;
two clamp arms, a first clamp arm being on a leading-edge side of the turbine component with a first clamp surface facing the turbine component, and a second clamp arm being on a trailing-edge side of the turbine component with a second clamp surface facing the turbine component, each clamp arm being movable between a released position in which its clamp surface does not contact one of the pressure surfaces and a clamped position in which its clamp surface contacts one of the pressure surfaces and forces the turbine component in the clamping direction and against the stop; and
a clamping force source that controllably moves each of the clamp arms between the released position and the clamped position.

2. The fixture of claim 1, wherein the turbine component is a turbine blade.

3. The fixture of claim 1, wherein the first pair of first pressure surfaces engage the stop and the second pair of second pressure surfaces are each contacted by one of the respective clamp surfaces.

4. The fixture of claim 1, wherein the stop comprises a shoulder.

5. The fixture of claim 1, wherein each clamp surface is conformably shaped to the pressure surface that is contacted by the clamp surface when the clamp arm is in the clamped position.

6. The fixture of claim 1, wherein the clamping force source comprises a hydraulic cylinder.

7. The fixture of claim 1, wherein the clamp arms are each pivotably mounted.

8. The fixture of claim 1, wherein the first angle is acute and the second angle is obtuse.

9. A fixture used with a gas turbine blade having a component longitudinal axis and comprising a root having a root surface including a first pair of first pressure surfaces on either side of the component longitudinal axis and oriented at an acute angle to the component longitudinal axis, a second pair of second pressure surfaces on either side of the component longitudinal axis and oriented at an obtuse angle to the component longitudinal axis, a tang at an end of the root and an airfoil at another end of the root, the fixture comprising a base;
a pair of stop shoulders affixed to the base and which engage the respective first pair of first pressure surfaces and prevent the turbine blade from moving past a stop limit when the turbine component is forced in a clamping direction parallel to the component longitudinal axis and extending from the root toward the airfoil;
two pivotable clamp arms, a first clamp arm being on a leading-edge side of the turbine blade with a first clamp surface facing the turbine blade, and a second clamp arm being on a trailing-edge side of the turbine blade with a second clamp surface facing the turbine blade, each clamp arm being pivotable between a released position in which its clamp surface does not contact one of the second pair of second pressure surfaces and a clamped position in which its clamp surface contacts one of the second pair of second pressure surfaces and forces the turbine blade in the clamping direction and against the pair of stop shoulders; and a pair of hydraulic cylinders, one of the hydraulic cylinders controllably moving each of the clamp arms between the released position and the clamped position.

10. The fixture of claim 9, wherein each clamp surface is conformably shaped to a portion of the second pressure surface that is contacted by the clamp surface when the clamp arm is in the clamped position.

11. A method for shaping a turbine component, comprising the steps of furnishing the turbine component having a component longitudinal axis and comprising a root having a root surface including a first pair of first pressure surfaces on either side of the component longitudinal axis and oriented at an acute angle to the component longitudinal axis, a second pair of second pressure surfaces on either side of the component longitudinal axis and oriented at an obtuse angle to the component longitudinal axis, and a tang at an end of the root;

furnishing a fixture comprising
 a base;
 a stop affixed to the base and which prevents the turbine component from moving past a stop limit when the turbine component is forced in a clamping direction parallel to the component longitudinal axis,
 two clamp arms, a first clamp arm being on a leading-edge side of the turbine component with a first clamp surface facing the turbine component, and a second clamp arm being on a trailing-edge side of the turbine component with a second clamp surface facing the turbine component, each clamp arm being movable between a released position in which its clamp surface does not contact one of the pressure surfaces and a clamped position in which its clamp surface contacts one of the pressure surfaces and forces the turbine component in the clamping direction and against the stop, and a clamping force source that controllably moves each of the clamp arms between the released position and the clamped position;

clamping the turbine component in the fixture; and thereafter shaping the root of the turbine component while the turbine component is clamped into the fixture.

12. The method of claim 11, wherein the step of shaping includes the step of grinding the root of the turbine component.

13. The method of claim 11, wherein the step of shaping includes the step of shaping the tang of the turbine component.

14. The method of claim 11, wherein the step of clamping includes the step of engaging one of the pair of the pressure surfaces against the stop.

15. The method of claim 11, wherein the step of furnishing the fixture includes the step of furnishing the stop comprising a shoulder.

16. The method of claim 11, wherein the step of furnishing the fixture includes the step of furnishing each clamp surface to be conformably shaped to a portion of the pressure surface of the root that is contacted by the clamp surface when the clamp arm is in the clamped position.

17. The method of claim 11, wherein the step of furnishing the fixture includes the step of furnishing the clamping force source comprising a hydraulic cylinder.

18. The method of claim 11, wherein the step of furnishing the fixture includes the step of furnishing the clamp arms that are each pivotably supported.

* * * * *